Patented Dec. 6, 1949

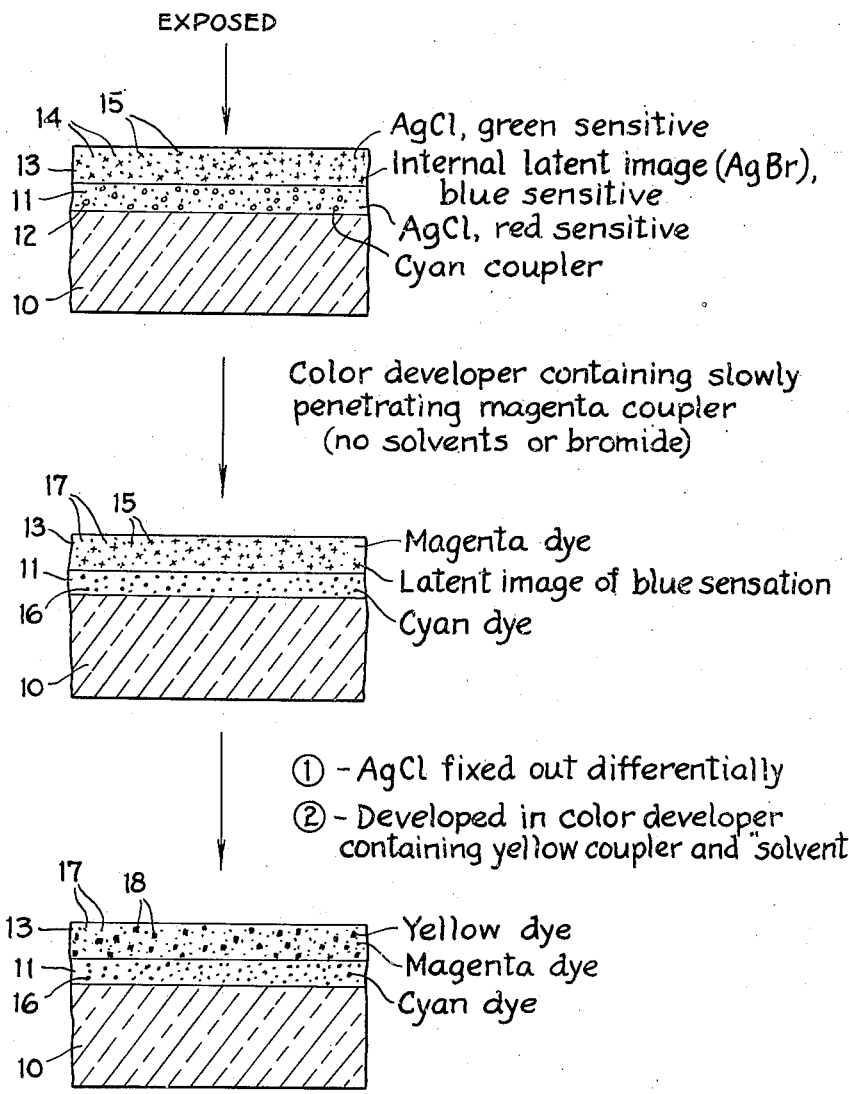

2,490,751

UNITED STATES PATENT OFFICE 2,490,751

MIXED GRAIN MULTILAYER PHOTOGRAPHIC FILM AND PROCESS

Wesley T. Hanson, Jr., Rochester, N. Y., assignor to Eastman Kodak Company, Rochester, N. Y., a corporation of New Jersey Application March 11, 1948, Serial No. 14,176

6 Claims. (Cl. 95—2)

This invention relates to photography and particularly to a mixed grain multi-layer film and process of color photography.

Mixed grain processes of color photography have been suggested many times in the photographic literature. None of these processes has found commercial success, because of the difficulty in keeping the differently sensitized silver halide particles separate in the emulsion and in processing them to obtain differently colored images. A method of effecting this separation in a mixed grain process involving the use of two separate emulsion layers to obtain three colors, has been described in Knott and Stevens U. S. application Ser. No. 10,186, filed February 21, 1948, now Patent No. 2,452,765 of November 2, 1948. The Knott and Stevens process involves the use of an "internal latent image" emulsion mixed with an ordinary surface latent image emulsion as one of the layers of a multi-layer element. In the Knott and Stevens process, a red-sensitive silver bromide or silver bromoiodide emulsion is coated on a support and on the red-sensitive emulsion there is coated a layer of mixed ordinary surface latent image emulsion and internal latent image emulsion. The ordinary surface latent image emulsion of the mixed layer is a silver chloride emulsion and the internal latent image emulsion is a silver bromoiodide emulsion. The film is processed by separately developing each of the three emulsions.

I have found that the Knott and Stevens process may be simplified and that a mixed grain film may be made by using silver chloride emulsions for both of the surface latent image emulsions and incorporating a coupler in at least the single layer surface latent image emulsion. My film consists therefore of a support having coated thereon a red-sensitive or green-sensitive silver chloride emulsion containing a color coupler and over this emulsion layer a mixed layer of surface latent image, silver chloride emulsion green sensitized or red sensitized and an unsensitized internal latent image emulsion of the silver bromide or silver bromoiodide type. Preferably the single emulsion layer coated first on the support is red-sensitive, and surface latent image emulsion mixed with the internal latent image emulsion is green-sensitive.

The accompanying drawing shows in sectional view a photographic film at various stages in the preferred embodiment of my process.

The "internal latent image" emulsion referred to above and used in my invention is a silver halide emulsion so constituted that the latent image is formed mostly inside the silver halide grains and relatively little surface latent image is formed on the grains. In an emulsion of this type, an internal developer as defined hereinafter produces an image density many times greater than that produced by development in a surface developer as hereinafter defined.

An internal latent image emulsion is that known as Burton's emulsion described in Wall, "Photographic Emulsions," 1929, pages 52 and 53. An emulsion of this type may also be prepared by taking an ordinary silver bromoiodide emulsion containing between 0.5% and 5% of silver iodide (based on the total silver halide), coating it as a layer and then after drying it, treating it with the following bath:

Potassium bichromate _____ grams__12
Concentrated sulfuric acid _____ ccs__12
Water _____ ccs__1,000

The time of treatment in this bath must be sufficient to inhibit surface latent image formation as can be easily ascertained by exposure, after washing, and then treating with developers of Formulas I and III given below.

An "internal latent image" emulsion made as described in Davey and Knott U. S. application Serial No. 790,232, filed December 6, 1947, now abandoned, may also be used according to my invention. This emulsion is prepared by first forming in the absence of ammonia and in one or more stages silver salt grains consisting at least partly of a silver salt which is more soluble in water than silver bromide, subsequently converting the grains to silver bromide or silver bromoiodide and if the silver iodide content of the emulsion is less than 6% calculated on the total silver halide, treating such grains with an iodine compound to bring the silver iodide up to at least 6%, ripening preferably in the absence of ammonia and then either washing out some of the soluble salts or washing out the whole of the soluble salts, followed by the addition of soluble salts such as soluble chloride or bromide. An example of an emulsion made in this way is as follows:

*Solution No. 1*

Inert gelatine _____ grams__20 }
KCl _____ do____20 } at 40° C.
Water _____ cc__560 }

*Solution No. 2*

KCl _____ grams__100 } at 45° C.
Water _____ cc__520 }

*Solution No. 3*

AgNO₃ _____ grams__195 } at 45° C.
Water _____ cc__520 }

*Solution No. 4*

KBr _____ grams__160 {
KI _____ do____40 { at 45° C.
Water _____ cc__500 {

Run Solutions Nos. 2 and 3 simultaneously into Solution No. 1 in a vessel, taking 90 seconds to do this. Then ripen for 1 minute at 45° C. Next add Solution No. 4 then ripen for 20 minutes at 45° C. Next add 235 grams of inert gelatine (dry). Then ripen at 45° C. for 15 minutes during which time the gelatine dissolves. Set and shred the emulsion and then wash until free from all soluble bromide and then add about 150 cc. of 10% solution of KCl (by weight), and then add water to make 3½ litres.

An "internal latent image" type of silver halide emulsion may be defined as one which, when a test portion is exposed to a light intensity scale for a fixed time between 1/100 and 1 second, and developed for 4 minutes at 20° C. in the ordinary, "surface" developer (Formula I), exhibits a maximum density not greater than ⅕ the maximum density obtained when the same emulsion is equally exposed and developed for 3 minutes at 20° C. in an "internal" type developer (Formula II). Preferably the maximum density obtained with the "surface" developer is not greater than 1/10 the maximum density obtained when the same emulsion is developed in the "internal" type developer. Stated conversely, an "internal latent image" emulsion, when developed in an "internal" type developer (Formula II) exhibits a maximum density at least 5, and preferably at least 10, times the maximum density obtained when the same emulsion is exposed in the same way and developed in a "surface" developer (Formula I).

A "surface latent image" type of silver halide emulsion may be defined as one which when a test portion is exposed to a light intensity scale for a fixed time between 1/100 and 1 second and developed for 4 minutes at 20° C. in an ordinary "surface" developer (Formula I) exhibits a maximum density at least five times the maximum density obtained when an "internal latent image" type of silver halide emulsion, for example an emulsion such as that of Davey and Knott U. S. application Ser. No. 790,232, now abandoned, is developed in the same "surface" developer (Formula I) (both the surface latent image emulsion and the internal latent image emulsion being coated to give the same quantity of silver per unit area. Preferably the maximum density obtained with the surface latent image emulsion is at least 10 times the maximum density obtained with the internal latent image emulsion when coated, exposed and developed as stated above.

Developers used for determining the characteristics of the internal latent image and surface latent image emulsions according to the tests given above are as follows:

*Formula I.—"Surface" developer*

| | Grams |
|---|---|
| p-Hydroxyphenylglycine | 10 |
| Sodium carbonate (crystals) | 100 |
| Water to 1000 ccs. | |

Development time—4 minutes at 20° C.

*Formula II.—"Internal" developer*

| | Grams |
|---|---|
| Hydroquinone | 15 |
| n-Methyl-p-aminophenol sulfate | 15 |
| Sodium sulfite (anhydrous) | 50 |
| Potassium bromide | 10 |
| Sodium hydroxide | 25 |
| Sodium thiosulfate (crystals) | 20 |
| Water to 1000 ccs. | |

Development time—3 minutes at 20° C.

The present invention provides a sensitive photographic material comprising on a single support two sensitive silver halide emulsion layers, one of which is a single red-sensitive silver chloride emulsion layer of the surface latent image type and the other of which is a mixture of green-sensitive silver chloride surface latent image emulsion and blue-sensitive silver bromide or silver bromoiodide internal latent image emulsion. The red-sensitive silver chloride surface latent image emulsion contains a color coupler capable of producing a cyan dye and the green-sensitive silver chloride surface latent image emulsion may, or may not, contain a color coupler capable of producing a magenta dye. The film used according to the preferred embodiment of my invention is shown in sectional view in the first stage of the drawing. As shown therein, a support 10 of any suitable material such as cellulose ester, synthetic resin or paper is coated with an emulsion layer 11 sensitized with red-sensitive silver chloride grains and containing dispersed particles of coupler 12 capable of producing a cyan image. On the emulsion layer 11, there is coated a mixed emulsion layer 13 containing green-sensitive silver chloride particles 14 and unsensitized or blue-sensitive particles 15 of internal latent image emulsion. This sensitive element was prepared as follows:

On a support, there was first coated a silver chloride surface latent image type emulsion red sensitized with 3,3-dimethyl-4,5,4',5'-dibenzthiocarbocyanine iodide and containing 7.5 grams per liter of emulsion of the cyan-producing coupler 4,6-dichloro-5-methyl-2-(2',4'-di-tert.amyl phenoxy acetamino)-phenol.

The coupler was incorpated in the emulsion according to the method described in Example 1 of Jelley and Vittum U. S. Patent 2,322,027. Over this layer there was coated a mixture of a silver chloride emulsion of the surface latent image type green sensitized with a sensitizing dye having little or no tendency to wander, for example 5-[(2-ethyl-1(2)-benzoxazolylidene)-ethylidene]-3 - n - primaryheptyl-1-phenyl-2-thiohydantoin, and an internal latent image type of silver bromoiodide emulsion sensitive to only the blue spectral region. The blue sensitivity of the silver chloride emulsions is so low that practically no image is formed therein during the time required to expose properly the internal latent image emulsion.

In processing this material, a color developer is first used which contains a slowly diffusing magenta forming coupler and which develops only the surface latent image emulsions. This developer forms a cyan dye in the red-sensitive silver chloride emulsion where that emulsion was exposed and a magenta dye in the green-sensitive silver chloride surface latent image emulsion where that emulsion was exposed. Since the developer is one which develops the surface latent image emulsions only, no development of the internal latent image emulsion takes place. A second color developer of the internal type, containing a yellow-forming coupler is then used to develop a yellow dye image in the internal latent image emulsion where that emulsion was exposed. This process will now be described in greater detail.

After exposure of the element to a colored object, it is given a short treatment in a formaldehyde prehardening solution, washed and developed in the following developer:

| | Grams |
|---|---|
| 2-amino-5-diethylamino toluene hydrochloride | 2 |
| Sodium sulfite | 2 |
| Sodium carbonate | 20 |
| Potassium chloride | 4 |
| Sodium hexametaphosphate | 1 |
| 6-nitrobenzimidazol nitrate | 0.15 |
| Sodium hydroxide | 1.7 |
| Magenta coupler | 1 |
| Water to 1 liter. | |

The magenta coupler used in the first developer is a slowly penetrating coupler which diffuses only through the top emulsion layer in the time required to develop a cyan image in the bottom emulsion layer. In the case of the developing solution described above, this development takes place in 10 minutes at 68° F. In this case the magenta coupler was 1-phenyl-3-[meta(p-ter. amyl-phenoxy)benzoylamino]-5-pyrazolone. Any suitable slowly penetrating magenta coupler can be employed. It is also essential that the first developer contain no silver halide solvent such as hypo which would cause the developer to develop the internal latent image emulsion. Furthermore, it is essential that the developer contain no bromide since this would prevent differential fixing out of the silver chloride which takes place at a later stage in the process.

After the first development, the film appears as shown in the second stage of the drawing, emulsion layer 11 containing a cyan dye image 16 and emulsion layer 13 containing a magenta dye image 17. The internal latent image emulsion particles 15 have not been affected.

After the first development, the element is treated in a stop bath of the following composition:

| | |
|---|---|
| Sodium sulfite | grams 75.0 |
| Acetic acid (28%) | cc 23 |
| Boric acid | grams 37 |
| Potassium alum | do 75 |
| Water to 1 liter. | | and is then rinsed in water and treated in an alkali bath of the following composition:

| | Grams |
|---|---|
| Sodium sulfite | 5.0 |
| Sodium carbonate | 20.0 |
| Potassium bromide | 1.0 |
| Sodium hydroxide | 1.0 |
| Water to 1 liter. | | to remove any residual magenta coupler which remains in the emulsion layer. The stop bath or the alkali bath may contain resorcinol to react with any residual developing agent in the film and thereby form a soluble dye which washes from the layer. The negative silver images may then be bleached to silver chloride or they may be allowed to remain as silver prior to the differential fixing step.

The next step is to remove the residual silver chloride in both emulsion layers without affecting the silver bromoiodide of the internal latent image emulsion. The internal latent image emulsion is to be developed in an internal type developer and since this would also develop an image in the silver chloride surface latent emulsions, it is necessary to remove any residual silver chloride before development of the internal latent image emulsion. The differential fixing bath used for this purpose has the following composition:

| | | |
|---|---|---|
| Sodium sulfite | grams | 100 |
| Sodium carbonate | do | 10 |
| Sodium hydroxide | do | 1 |
| Potassium bromide | do | 2 |
| Ethylene diamine | cc | 12 |
| Water to 1 liter. | | |

After a water wash the element is developed in the following color developer to develop a yellow dye image in the internal latent image emulsion in the top layer.

| | Grams |
|---|---|
| 2-amino-5-diethyl amino toluene hydrochloride | 3 |
| Sodium sulfite | 5 |
| Sodium carbonate | 20 |
| Sodium hydroxide | 1 |
| Sodium hexametaphosphate | 1 |
| Sodium thiosulfate | 2.5 |
| ω-Benzoyl acet-(p-benzenesulfonamido) anilide | 3 |

After development for 15 minutes at 68° F. in this developer, the film is rinsed in water and treated in a stop bath of the following composition:

| | | |
|---|---|---|
| Sodium sulfite | grams | 75 |
| Acetic acid (28%) | cc | 23 |
| Boric acid | grams | 37 |
| Potassium alum | do | 75 |
| Water to 1 liter. | | |

The film is then bleached for about six minutes in a solution of the following composition:

| | | |
|---|---|---|
| Potassium ferricyanide | grams | 50 |
| Ammonium hydroxide (28% solution) | cc | 2½ |
| Potassium bromide | grams | 5 |
| Water to 1 liter. | | |

The film is then fixed for about 4 minutes in a fixing bath of the following composition:

| | | |
|---|---|---|
| Sodium sulfite (desiccated) | grams | 15 |
| Sodium thiosulfate | do | 240 |
| Acetic acid (28%) | cc | 48 |
| Boric acid (crystals) | grams | 7.5 |
| Potassium alum | do | 15 |
| Water to 1 liter. | | |

After a short water wash, the film appears as shown in the last stage of the drawing in which emulsion layer 11 contains a cyan dye image 16 and an emulsion layer 13 contains a magenta dye image 17 and a yellow dye image 18.

In the process just described, it is sometimes found that the differential fixing step does not satisfactorily remove the residual silver chloride in the presence of the silver bromoiodide emulsion. As an alternative method of separation, the film may be completely exposed with yellow light after the first development step and the residual silver chloride in the two emulsion layers developed to completion in a non-solvent, non-color forming developer such as a developer of the following composition.

| | Grams |
|---|---|
| N-methyl-p-aminophenol sulfate | 3.1 |
| Sodium sulfite (desiccated) | 45 |
| Hydroquinone | 12 |
| Sodium carbonate (desiccated) | 67.5 |
| Potassium bromide | 1.9 |
| Water to 1 liter. | |

The yellow light exposure affects only the green-sensitive and red-sensitive silver chloride grains and does not expose the blue-sensitive internal latent image emulsion. The developer is a surface latent image type of developer and therefore develops only the silver chloride emulsions thus exposed. The negative and residual silver images of the silver chloride emulsions may be allowed to remain or may be removed by means of a bichromate bleach bath of the following composition:

| | |
|---|---|
| Ammonium bichromate _____grams__ | 20 |
| Concentrated sulfuric acid _____cc__ | 5 |
| Water to 1 liter. | |

Following this treatment to remove the residual silver images, the film is washed and developed in the internal developer containing the yellow-forming coupler as described above.

According to a further modification of my process, the use of a slowly penetrating magenta coupler may be avoided by incorporating a magenta-forming coupler in the silver chloride emulsion of the top emulsion layer and developing the yellow dye image with a developer which contains a developing agent that does not couple with the cyan-forming and magenta-forming couplers in the emulsion layers, but which does couple with the yellow-forming coupler incorporated in the developing solution. This developer would be used after first developing the cyan and magenta images in a developing solution of the surface type containing no coupler. A developer suitable for developing the yellow dye image in the internal latent emulsion in this way is as follows:

| | Grams |
|---|---|
| Diiodo-p-amino phenol _____ | 2.5 |
| Sodium sulfite _____ | 5 |
| Sodium carbonate _____ | 10 |
| Potassium bromide _____ | 1 |
| Sodium hexametaphosphate _____ | 0.5 |
| Sodium thiosulfate _____ | 5 |
| Sodium hydroxide _____ | 2.5 |
| ω-Benzoylacetanilide _____ | 2.5 |
| Water to 1 liter. | |

According to a still further modification of my process, the coupler incorporated in the bottom or single emulsion layer may be a magenta-forming or yellow-forming coupler. The dye images formed in the mixed grain layer would then be cyan and either magenta or yellow, depending on which color was formed in the single layer. This combination produces a false arrangement of the color, and would be used either in printing from color separation images or from a false-color original.

It will be understood that the examples and modifications included herein are illustrative only.

I claim:

1. A two-layer, three-color photographic element comprising a support having thereon a red-sensitive silver chloride emulsion which when developed in the following developer (I):

| | Grams |
|---|---|
| p-Hydroxy phenyl glycine _____ | 10 |
| Sodium carbonate _____ | 100 |
| Water to 1 liter. | | gives a maximum density at least five times the maximum density obtained when the hereinafter described silver bromide emulsion is developed in developer (I) and containing a color coupler which couples with the oxidation product of a primary aromatic amino developing agent upon photographic development to give a colored image, and a second silver halide emulsion layer containing a mixture of silver chloride grains of the type specified above and sensitized to green light, and silver bromide grains of the type of which a test portion upon exposure to a light intensity scale for a fixed time between 1/100 and 1 second and development for 3 minutes at 20° C. in the following internal type developer (II):

| | Grams |
|---|---|
| Hydroquinone _____ | 15 |
| Monomethyl-p-amino phenol sulfate_____ | 15 |
| Anhydrous sodium sulphite _____ | 50 |
| Potassium bromide _____ | 10 |
| Sodium hydroxide _____ | 25 |
| Sodium thiosulfite _____ | 20 |
| Water to 1 liter. | | gives a maximum density at least five times the maximum density obtained when the equally exposed silver halide emulsion is developed for four minutes at 20° C. in developer (I), said last-mentioned silver bromide grains being sensitive only to blue light.

2. A sensitive photographic element comprising a support having thereon two superposed emulsion layers, one of said layers comprising a mixture of a blue-sensitive silver halide emulsion (1) a test portion of which upon exposure to a light intensity scale for a fixed time between 1/100 and 1 second and development for 3 minutes at 20° C. in the following developer (II):

| | Grams |
|---|---|
| Hydroquinone _____ | 15 |
| N-methyl-p-aminophenol sulfate _____ | 15 |
| Sodium sulfite, anhydrous _____ | 50 |
| Potassium bromide _____ | 10 |
| Sodium hydroxide _____ | 25 |
| Sodium thiosulfate, crystals _____ | 20 |
| Water to 1000 ccs. | | gives a maximum density at least 5 times the maximum density obtained when the equally exposed identical silver halide emulsion is developed for 4 minutes at 20° C. in the following surface developer (I):

| | Grams |
|---|---|
| p-Hydroxyphenylglycine _____ | 10 |
| Sodium carbonate _____ | 100 |
| Water to 1000 ccs. | | and a green-sensitive silver chloride emulsion (2) a test portion of which upon exposure to a light intensity scale for a fixed time between 1/100 and 1 second and development for 4 minutes at 20° C. in developer (I) gives a maximum density at least 5 times the maximum density obtained when an equally exposed test portion of emulsion (I) is developed under the same conditions in developer (I), and the other of said layers being a red-sensitive silver chloride emulsion having the same properties as emulsion (2) specified above, and containing a coupler capable of producing a cyan dye image.

3. A two-layer, three-color photographic element comprising a support having thereon a silver chloride emulsion layer sensitive to one of the primary colors of a longer wave length than blue, which when developed in the following developer (I):

| | Grams |
|---|---|
| p-Hydroxy phenyl glycine _____ | 10 |
| Sodium carbonate _____ | 100 |
| Water to 1 liter. | | gives a maximum density at least five times the maximum density obtained when the hereinafter described silver bromide emulsion is developed in developer (I) and containing a color coupler which couples with the oxidizing product of a primary aromatic amino developing agent upon photographic development to give a colored image and a second silver halide emulsion layer containing a mixture of silver chloride grains of the type specified above and sensitized to the other primary color of a wave length longer than blue, and silver bromide grains of the type of which a test portion upon exposure to a light intensity scale for a fixed time between $1/100$ and 1 second and development for three minutes at 20° C. in the following internal type developer (II):

| | Grams |
|---|---|
| Hydroquinone | 15 |
| Monomethyl-p-amino phenol sulfate | 15 |
| Anhydrous sodium sulphite | 50 |
| Potassium bromide | 10 |
| Sodium hydroxide | 25 |
| Sodium thiosulfite | 20 |
| Water to 1 liter. | | gives a maximum density at least five times the maximum density obtained when the equally exposed silver halide emulsion is developed for four minutes at 20° C. in developer (I), said last-mentioned silver bromide grains being sensitive only to blue light.

4. The method of forming a multi-color photographic image in a two-layer, three-color photographic element comprising a support having thereon a red-sensitive silver chloride emulsion which when developed in the following developer (I):

| | Grams |
|---|---|
| p-Hydroxy phenyl glycine | 10 |
| Sodium carbonate | 100 |
| Water to 1 liter. | | gives a maximum density at least five times the maximum density obtained when the hereinafter described silver bromide emulsion is developed in developer (I) and containing a color coupler which couples with the oxidation product of a primary aromatic amino developing agent upon photographic development to give a colored image, and a second silver halide emulsion layer containing a mixture of silver chloride grains of the type specified above and sensitized to green light, and silver bromide grains of the type of which a test portion upon exposure to a light intensity scale for a fixed time between $1/100$ and 1 second and development for 3 minutes at 20° C. in the following internal type developer (II):

| | Grams |
|---|---|
| Hydroquinone | 15 |
| Monomethyl-p-amino phenol sulfate | 15 |
| Anhydrous sodium sulphite | 50 |
| Potassium bromide | 10 |
| Sodium hydroxide | 25 |
| Sodium thiosulfite | 20 |
| Water to 1 liter. | | gives a maximum density at least five times the maximum density obtained when the equally exposed silver halide emulsion is developed for four minutes at 20° C. in developer (I), said last-mentioned silver bromide grains being sensitive only to blue light, which comprises exposing said element to light rays, developing said element in a solution of a primary aromatic amino developing agent containing a coupler compound which diffuses only into the outermost layer in the time required to develop an image in both layers, said solution being free of silver halide solvent and soluble bromide, removing the developed silver and residual silver chloride from both layers and developing a colored image in the top layer with a developing solution containing a primary aromatic amino developing agent, a color coupler, and a silver halide solvent.

5. The method of forming a colored image in a two-layer, three-color photographic element comprising a support having thereon a red-sensitive silver chloride emulsion which when developed in the following developer (I):

| | Grams |
|---|---|
| p-Hydroxy phenyl glycine | 10 |
| Sodium carbonate | 100 |
| Water to 1 liter. | | gives a maximum density at least five times the maximum density obtained when the hereinafter described silver bromide emulsion is developed in developer (I) and containing a color coupler which couples with the oxidation product of a primary aromatic amino developing agent upon photographic development to give a colored image, and a second silver halide emulsion layer containing a mixture of silver chloride grains of the type specified above and sensitized to green light, and silver bromide grains of the type of which a test portion upon exposure to a light intensity scale for a fixed time between $1/100$ and 1 second and development for 3 minutes at 20° C. in the following internal type developer (II):

| | Grams |
|---|---|
| Hydroquinone | 15 |
| Monomethyl-p-amino phenol sulfate | 15 |
| Anhydrous sodium sulphite | 50 |
| Potassium bromide | 10 |
| Sodium hydroxide | 25 |
| Sodium thiosulfite | 20 |
| Water to 1 liter. | | gives a maximum density at least five times the maximum density obtained when the equally exposed silver halide emulsion is developed for four minutes at 20° C. in developer (I), said last-mentioned silver bromide grains being sensitive only to blue light which comprises exposing said element to a colored object, developing a colored image in at least the red-sensitive silver chloride emulsion with a surface color developer, and thereafter developing a yellow dye image in the blue-sensitive emulsion layer with a color developer containing a color coupler and a silver halide solvent.

6. The method of forming a colored image in a two-layer, three-color photographic element comprising a support having thereon a red-sensitive silver chloride emulsion which when developed in the following developer (I):

| | Grams |
|---|---|
| p-Hydroxy phenyl glycine | 10 |
| Sodium carbonate | 100 |
| Water to 1 liter. | | gives a maximum density at least five times the maximum density obtained when the hereinafter described silver bromide emulsion is developed in developer (I) and containing a color coupler which couples with the oxidation product of a primary aromatic amino developing agent upon photographic development to give a colored image, and a second silver halide emulsion layer containing a mixture of silver chloride grains of the type specified above and sensitized to green light, and silver bromide grains of the type of which a test portion upon exposure to a light intensity scale for a fixed time between $1/100$ and 1 second and development for 3 minutes at 20° C. in the following internal type developer (II):

| | Grams |
|---|---|
| Hydroquinone | 15 |
| Monomethyl-p-amino phenol sulfate | 15 |
| Anhydrous sodium sulphite | 50 |
| Potassium bromide | 10 |
| Sodium hydroxide | 25 |
| Sodium thiosulfite | 20 |
| Water to 1 liter. | | gives a maximum density at least five times the maximum density obtained when the equally exposed silver halide emulsion is developed for four minutes at 20° C. in developer (I), said last-mentioned silver bromide grains being sensitive only to blue light, which comprises exposing said element to a colored object, developing a colored image in the silver chloride emulsions with a surface color developer having incorporated therein a slowly diffusing magenta-forming coupler which diffuses into and forms a magenta dye image in the silver chloride emulsion of the mixed emulsion layer in the time required to develop a cyan image in the single silver chloride emulsion layer, and thereafter developing a yellow dye image in the blue-sensitive emulsion layer with a color developer containing a yellow-forming coupler and a silver halide solvent.

WESLEY T. HANSON, Jr.

No references cited.